US012771193B2

(12) United States Patent
Yamamoto et al.

(10) Patent No.: US 12,771,193 B2
(45) Date of Patent: Oct. 20, 2026

(54) ROTOR, ROTATING ELECTRIC MACHINE, AND ELECTRIC POWER STEERING DEVICE

(71) Applicant: Mitsubishi Electric Corporation, Tokyo (JP)

(72) Inventors: Takashi Yamamoto, Tokyo (JP); Masafumi Okazaki, Tokyo (JP); Satoru Akutsu, Tokyo (JP); Shohei Fujikura, Tokyo (JP); Kenta Motoyoshi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 241 days.

(21) Appl. No.: 18/697,514

(22) PCT Filed: Oct. 20, 2021

(86) PCT No.: PCT/JP2021/038744
§ 371 (c)(1),
(2) Date: Apr. 1, 2024

(87) PCT Pub. No.: WO2023/067721
PCT Pub. Date: Apr. 27, 2023

(65) Prior Publication Data

US 2024/0429760 A1 Dec. 26, 2024

(51) Int. Cl.
*H02K 1/278* (2022.01)
*B62D 5/04* (2006.01)
*H02K 29/03* (2006.01)

(52) U.S. Cl.
CPC ............... *H02K 1/278* (2013.01); *B62D 5/04* (2013.01); *H02K 29/03* (2013.01); *H02K 2201/06* (2013.01)

(58) Field of Classification Search
CPC ....... H02K 1/278; H02K 2201/06; B62D 5/04
(Continued)

(56) References Cited

U.S. PATENT DOCUMENTS 9,257,874 B2 * 2/2016 Haga ...................... H02K 1/274
9,705,366 B2 * 7/2017 Tanaka .................. H02K 29/03
(Continued)

FOREIGN PATENT DOCUMENTS

EP 2991204 A1 3/2016
EP 3109972 B1 12/2018
(Continued)

OTHER PUBLICATIONS

Japanese Office Action dated Nov. 18, 2025, issued in Japanese application No. 2023-554147.
(Continued)

*Primary Examiner* — Burton S Mullins
(74) *Attorney, Agent, or Firm* — Sughrue Mion, PLLC

(57) ABSTRACT

A rotor according the present disclosure includes: a shaft a first rotor core and a second rotor core a plurality of first magnets that are disposed so as to align in a circumferential direction on an outer circumferential surface of the first rotor core, and a plurality of second magnets that are disposed so as to align in the circumferential direction on the outer circumferential surface of the second rotor core, wherein locations of the plurality of first magnets and the plurality of second magnets are offset in the circumferential direction, and an interval between the plurality of first magnets and the plurality of second magnets in the axial direction is within a range of 0.5 to 3.0 mm.

14 Claims, 5 Drawing Sheets

(58) Field of Classification Search
USPC .......................... 310/156.13, 156.25, 156.47
See application file for complete search history.

(56) References Cited

U.S. PATENT DOCUMENTS

| | | | | |
|---|---|---|---|---|
| 2013/0257211 | A1 | 10/2013 | Haga et al. | |
| 2019/0140500 | A1 | 5/2019 | Takizawa et al. | |
| 2019/0356179 | A1* | 11/2019 | Kim | H02K 16/04 |
| 2019/0386528 | A1* | 12/2019 | Lee | H02K 1/278 |
| 2020/0136447 | A1 | 4/2020 | Lee et al. | |
| 2022/0278574 | A1 | 9/2022 | Oh | |

FOREIGN PATENT DOCUMENTS

| | | | |
|---|---|---|---|
| EP | 3576254 | A1 | 12/2019 |
| EP | 3107191 | B1 | 6/2020 |
| JP | 3008272 | U | 3/1995 |
| JP | 8-331782 | A | 12/1996 |
| JP | 2010-206939 | A | 9/2010 |
| JP | 2014-209847 | A | 11/2014 |
| JP | 5720939 | B2 | 5/2015 |
| KR | 10-2020-0036616 | A | 4/2020 |
| WO | 2017/212575 | A1 | 12/2017 |
| WO | 2021/034072 | A1 | 2/2021 |

OTHER PUBLICATIONS

Office Action issued Mar. 11, 2025 in Japanese Application No. 2023-554147.

International Search Report issued Dec. 7, 2021 in International Application No. PCT/JP2021/038744.

Communication dated Nov. 12, 2024 from the Japanese Patent Office in Application No. 2023-554147.

Extended European Search Report dated Nov. 14, 2024 in application No. 21961374.2.

Communication dated Jun. 12, 2026, issued in European Application No. 21 961 374.2.

* cited by examiner

ROTOR, ROTATING ELECTRIC MACHINE, AND ELECTRIC POWER STEERING DEVICE

CROSS REFERENCE TO RELATED APPLICATIONS

This is a National Stage of International Application No. PCT/JP2021/038744 filed Oct. 20, 2021.

TECHNICAL FIELD

The present disclosure relates to a rotor, a rotating electric machine, and an electric power steering device.

BACKGROUND ART

The rotating electric machine of Patent Document 1 includes a rotor and a stator. The rotor has a first rotor core, a second rotor core, and a plurality of magnets that are aligned and disposed on an outer circumferential surface of each rotor core. Locations of magnets of the first rotor core (herein referred to as a "first magnet") and magnets of the second rotor core (herein referred to as a "second magnet") are offset in the circumferential direction. As such, adopting what is known as a "step skew construction" of the rotors is known to reduce torque ripple.

CITATION LIST

Patent Document

Patent Document 1

Japanese Patent No. 5720939

SUMMARY OF INVENTION

Problem to be Solved by the Invention

In a rotor of a step skew construction, when a first magnet and a second magnet come into contact, magnets of differing polarities come into contact with one another. When magnets of differing polarities come into contact with one another, magnetic flux leakage at the location of contact becomes large, increasing torque ripple and so forth, which is connected to a decrease in performance of the rotating electric machine. Therefore, it is preferable that the first magnet and the second magnet are disposed so as not to come into contact with one another. The inventors of the present disclosure have found that making a distance between the first magnet and the second magnet too large leads to a decrease in performance of the rotating electric machine.

The present disclosure has been made in order to address the problem above, and an object is to avoid a decrease in performance of a rotating electric machine by optimizing a distance between a first magnet and a second magnet.

Means to Solve the Problem

A rotor, according to an embodiment of the present disclosure includes: a shaft; a first rotor core and a second rotor core that are fixed to the shaft, and that are disposed so as to align in an axial direction along a center axis of the shaft; a plurality of first magnets that are disposed so as to align in a circumferential direction which revolves around the center axis on an outer circumferential surface of the first rotor core, and a plurality of second magnets that are disposed so as to align in the circumferential direction on the outer circumferential surface of the second rotor core, wherein locations of the plurality of first magnets and the plurality of second magnets are offset in the circumferential direction, and an interval between the plurality of first magnets and the plurality of second magnets in the axial direction is within a range of 0.5 to 3.0 mm.

A rotating electric machine according to an embodiment of the present disclosure may include the rotor, and the stator that surrounds the rotor.

An electric power steering device according to an embodiment of the present disclosure may include the rotating electric machine mentioned above.

Effects of the Invention

According to the present disclosure, it is possible to avoid a decrease in performance of a rotating electric machine by optimizing a distance between a first magnet and a second magnet.

DESCRIPTION OF EMBODIMENTS

Hereinafter, embodiments pertaining of the present disclosure are explained with reference to the drawings. The extent of the present disclosure is not limited to the explanations of the embodiments below, and the embodiments may be changed as long as changes remain within the bounds of the technical scope thereof.

First Embodiment

Figure 1:
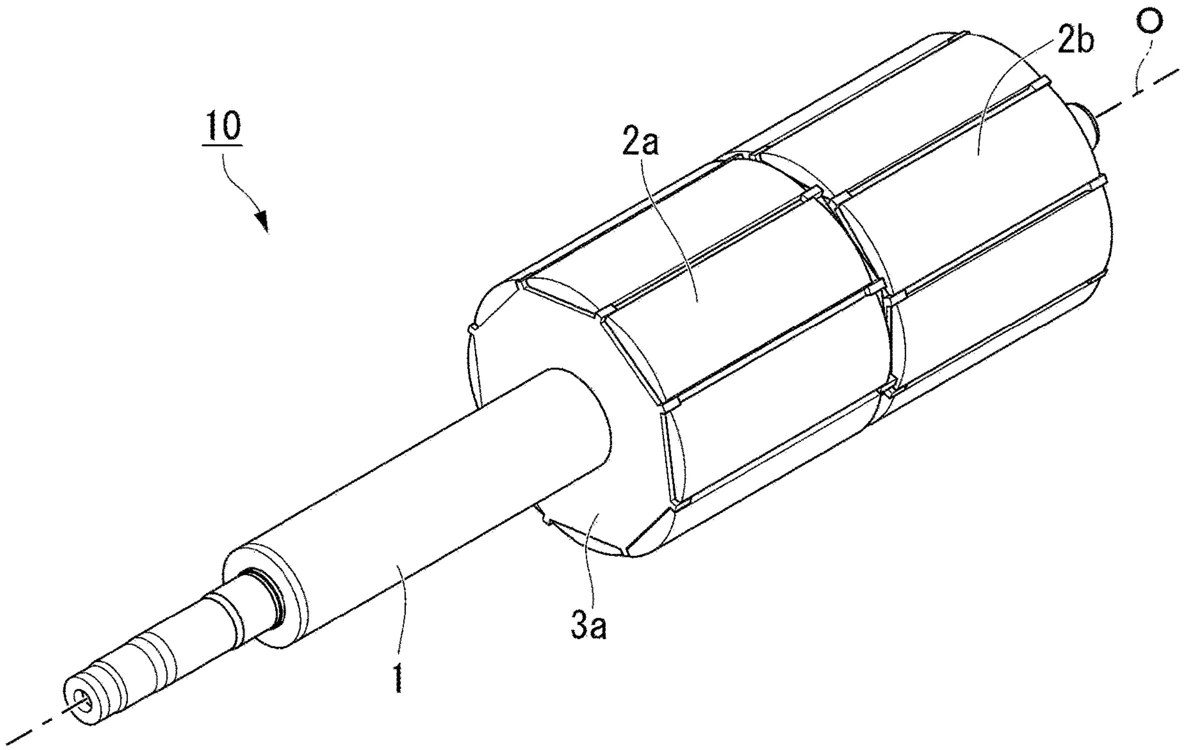
FIG. 1 A perspective view of a rotor according to a first embodiment.
Figure 2:
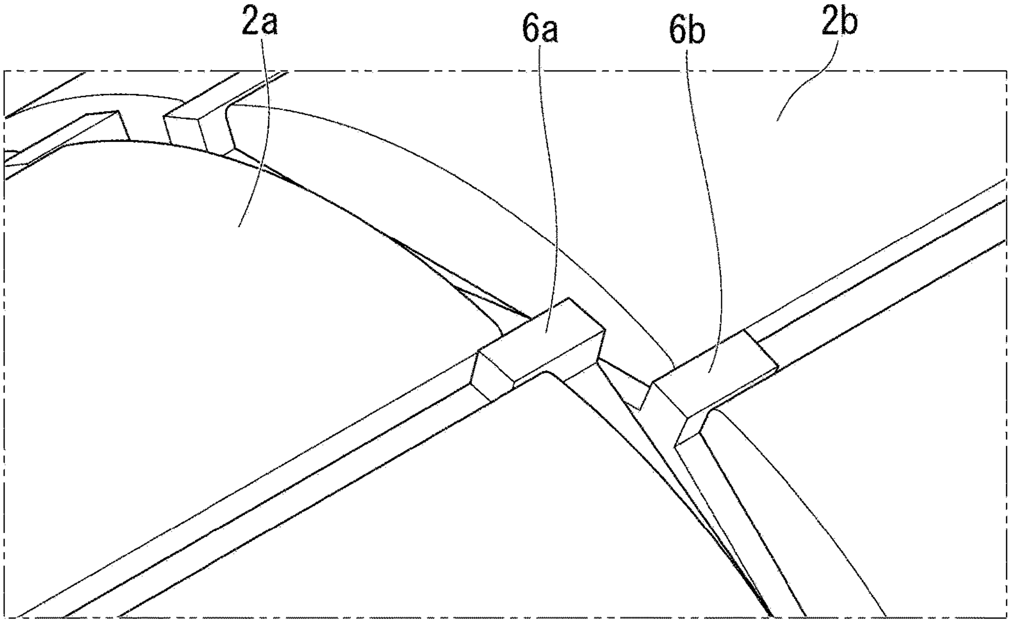
FIG. 2 An exploded view of FIG. 1.
Figure 3:
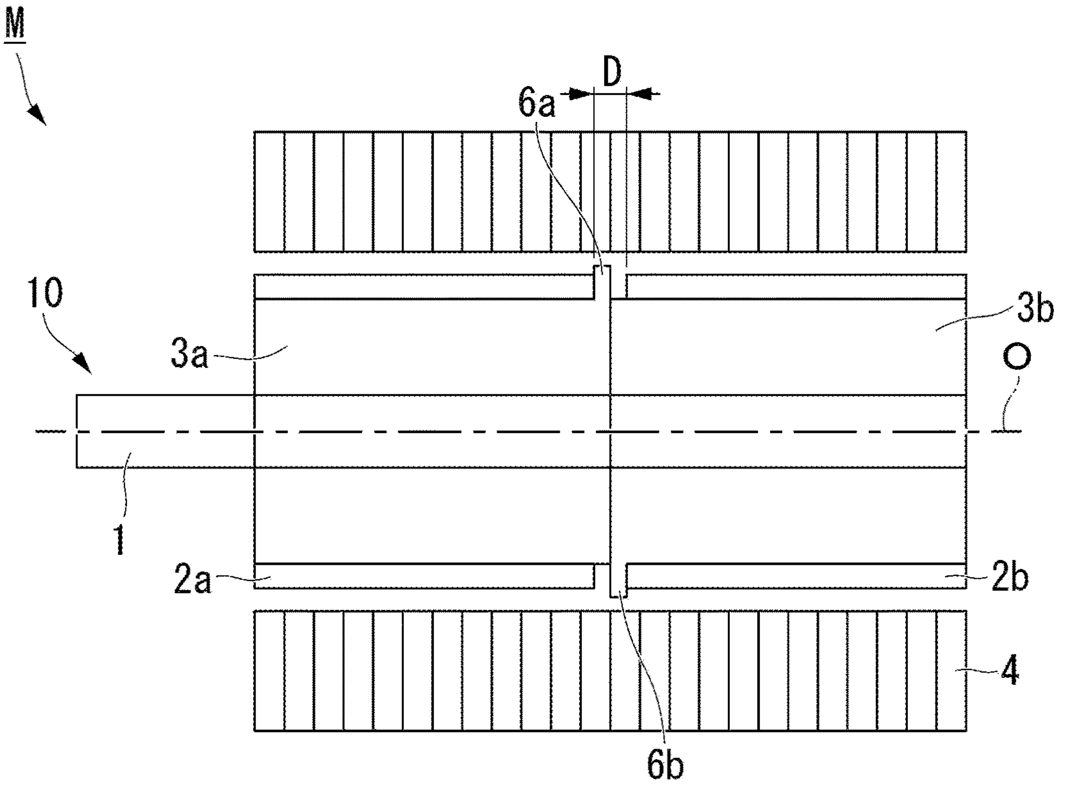
FIG. 3 A cross-sectional view of a rotating electric machine according to the first embodiment.

FIG. 1 is a perspective view of a rotor 10 in a first embodiment. FIG. 2 is an exploded view of FIG. 1. FIG. 3 is a cross-sectional view of a rotating electric machine M that includes the rotor 10 shown in FIG. 1. The rotating electric machine M is for example, used as a motor of an electric power steering device of a vehicle.

As shown in FIG. 3, the rotating electric machine M has the rotor 10 and a stator 4. The rotor 10 has a shaft 1, a first rotor core 3*a*, a second rotor core 3*b*, a plurality of first magnets 2*a*, and a plurality of second magnets 2*b*. The stator 4 is disposed so as to surround a first magnet 2*a* and a second magnet 2*b*. A vehicle steering apparatus that includes the electric power steering device is connected to the shaft 1.

In the present embodiment, a direction along a center axis O of the shaft 1 is referred to as an "axial direction". A direction that intersects with the center axis O, as seen from the axial direction, is referred to as a "radial direction". A direction which revolves around the center axis O is referred to as a "circumferential direction".

The first rotor core 3*a* and the second rotor core 3*b* are fixed to the shaft 1. The first rotor core 3*a* and the second rotor core 3*b* are disposed so as to align in the axial direction, in a state of being in contact with one another. The first rotor core 3*a* and the second rotor core 3*b* are for example formed by stacking a plurality of core pieces. A core piece, for example, is formed by press working a sheet of low-carbon steel. Materials and methods of forming the first rotor core 3*a* and the second rotor core 3*b* are not limited to the above, and may be changed accordingly.

The plurality of first magnets 2*a* are disposed so as to align equidistantly in the circumferential direction, on an outer circumferential surface of the first rotor core 3*a*. The plurality of second magnet 2*b* are disposed so as to align equidistantly in the circumferential direction, on an outer circumferential surface of the second rotor core 3*b*. A polarity of each of first magnets 2*a* mutually interchanges in the circumferential direction. Similarly, a polarity of each of second magnets 2*b* mutually interchanges in the circumferential direction. As an example of magnets 2*a* and 2*b*, it is possible to use niobium magnets. Materials of magnets 2*a*, 2*b* may also be changed accordingly.

The rotor 10 according to the present embodiment adopts the so-called step skew construction. Specifically, locations in the circumferential direction of the plurality of first magnets 2*a* and the plurality of second magnets 2*b* are offset from one another. As such, when attention is given to an arbitrary first magnet 2*a*, the arbitrary first magnet 2*a* is adjacent to two second magnets 2*b* in the axial direction. Polarities of the two second magnet 2*b* are different from one another. Therefore, one of the two second magnet 2*b* has a different polarity than the first magnet 2*a* adjacent thereto in the in the axial direction.

Although omitted from the drawings, a plurality of slots are provided so as to protrude to an inside in the radial direction of the stator 4. Each slot is disposed so as to align in the circumferential direction. The rotating electric machine M according to the present embodiment is a so-called eight-pole/twelve-slot motor. In other words, a number of each of the first magnet 2*a* and the second magnet 2*b* is eight, and a number of slots that the stator 4 has is twelve. Numbers of the first magnet 2*a*, the second magnet 2*b*, and the slots may be changed accordingly. The rotor 10 may also have three or more slot cores.

It is preferable for a length of the first rotor core 3*a* to be longer than a length of the first magnet 2*a* in the axial direction. Similarly, it is preferable for a length of the second rotor core 3*b* to be longer than a length of the second magnet 2*b* in the axial direction. Usually, a magnetic flux that is comes out of the magnets 2*a*, 2*b* passes through rotor cores 3*a*, 3*b* after passing through the stator 4, and returns to the magnets 2*a*, 2*b*. However, if the rotor cores 3*a*, 3*b* are shorter than the magnets 2*a*, 2*b* in the axial direction, parts of the magnets 2*a*, 2*b* are in a state of protruding out from the outer circumferential surface of the rotor cores 3*a*, 3*b*. In such a case, a surface facing the inside in the radial direction (herein referred to as an "inside circumferential surface") in the magnets 2*a*, 2*b* faces air in a part thereof. Out of the inside circumferential surface of the magnets 2*a*, 2*b*, returning of the magnetic flux is difficult in the part that faces air. A result of the above is linked to worsening of the torque ripple.

In the rotor 10 which adopts the step skew construction as in the present embodiment, even if the first magnet 2*a* and the second magnet 2*b* contact one another in the axial direction, magnets that have differing poles come into contact with one another. When the magnets that have differing poles come into contact with one another, a magnetic flux leakage at a location of contact becomes large, and the torque ripple increases. "Magnetic flux leakage" is a phenomenon that occurs when a magnetic flux coming out of a magnet does not pass through a conventional path (a path that goes through the stator, the rotor core and such), and thus does not contribute to torque generation of the rotating electric machine M. To suppress magnetic flux leakage, it is preferable to have the plurality of first magnets 2*a* and the plurality of second magnet 2*b* be separated in the axial direction. As shown in FIG. 3, a distance between the first magnet 2*a* and the second magnet 2*b* in the axial direction referred to as a "distance between magnets D" in the present description is shown.

If the distance between magnets D is too large, a volume of the magnets 2*a*, 2*b* decreases with respect to a size of the rotating electric machine M, and such is linked to a decrease in a torque output by the rotating electric machine M. As is understood through considerations by the inventors of the present invention, the larger the distance between magnets D becomes, the larger the torque ripple of a case of maximum output of the rotating electric machine M is. Hereinafter, FIG. 4 and FIG. 5 are used to explain the aforementioned in more detail.

Figure 4:
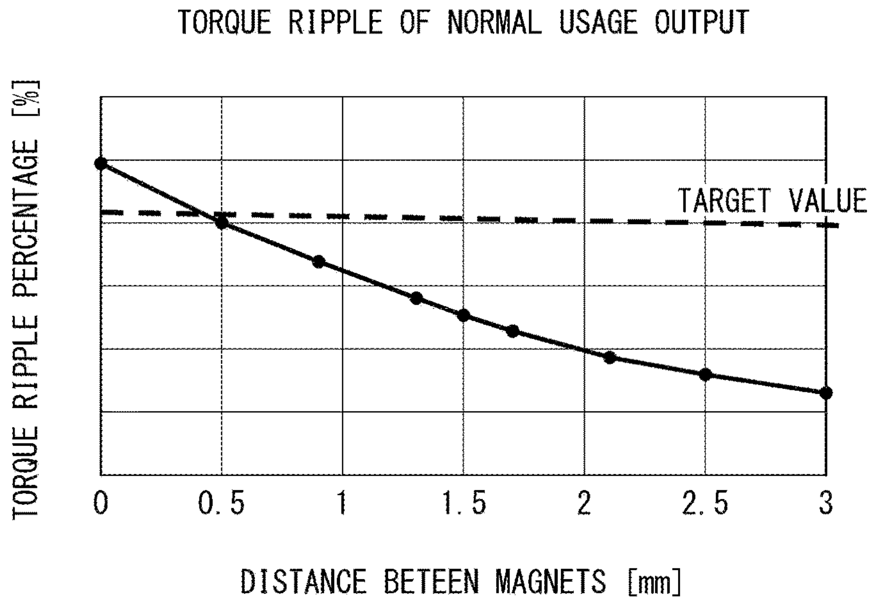
FIG. 4 A graph that shows a relationship between a distance between magnets and a torque ripple percentage, in a case of normal usage output.

FIG. 4 is a graph that shows a relationship between the torque ripple and the distance between magnets D, in a case of normal usage output of the rotating electric machine M used in the electric power steering device. FIG. 5 is a graph that shows a relationship between the torque ripple in the case of maximum output and the distance between magnets D of the rotating electric machine M similar to that of FIG. 4. The horizontal axis in FIG. 4 and FIG. 5 is the distance between magnets D, expressed in units of mm, and the vertical axis in FIG. 4 and FIG. 5 is a torque ripple percentage. The torque ripple percentage is a value of variability in an average value of the torque, shown as a percentile (%) amount.

As shown in FIG. 4, in normal usage output, the bigger the distance between magnets D, the more the torque ripple decreases. As a result of considerations done by the inventors of the present invention, when the distance between magnets D is greater than or equal to 0.5 mm, it is possible for the torque ripple percentage to be less than or equal to a target value.

Figure 5:
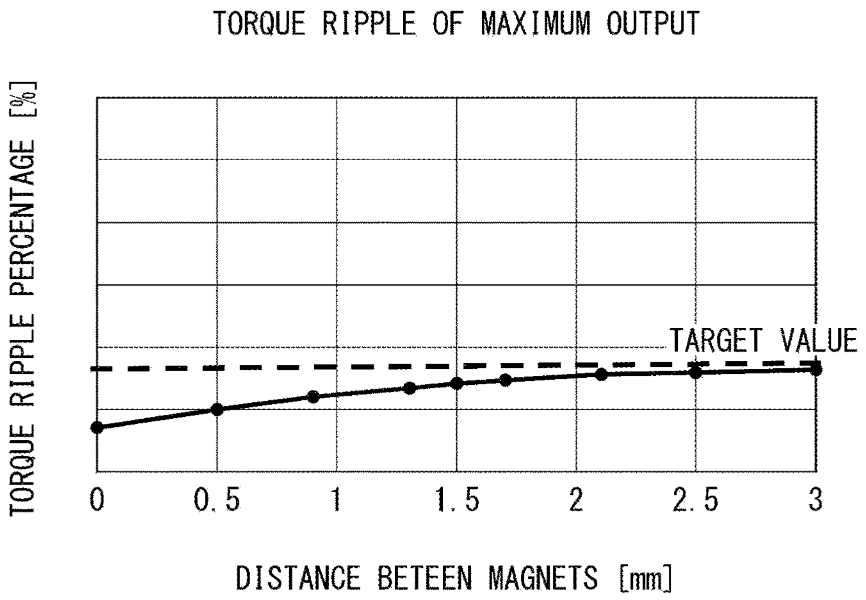
FIG. 5 A graph that shows a relationship between a distance between magnets and a torque ripple percentage, in a case of maximum output.

As shown in FIG. 5, in maximum output, the bigger the distance between magnets D, the more the torque ripple increases. As a result of considerations done by the inventors of the present invention, when the distance between magnets D is less than or equal to 3.0 mm, it is possible for the torque ripple percentage in the case of maximum output to be less than or equal to the target value.

Integrating the results of FIG. 4 and FIG. 5, having the distance between magnets D be greater than or equal to 0.5 mm, and less than or equal to 3.0 mm is preferable.

In the present embodiment, to have the distance between magnets D be a value within the range mentioned above, a first rotor core 3*a* is provided in a first protrusion 6*a*, and the second rotor core 3*b* is provided in a second protrusion 6*b* (refer to FIG. 2 and FIG. 3). The first protrusion 6*a* protrudes outwards in the radial direction from the outer circumferential surface of the first rotor core 3*a*. The first protrusion 6*a* is disposed in a location that contacts the second rotor core 3*b* in the axial direction. The first protrusion 6*a* is disposed between two of the first magnets 2*a* that are adjacent in the circumferential direction. The second protrusion 6*b* protrudes outwards in the radial direction from the outer circumferential surface of the second rotor core 3*b*. The second protrusion 6*b* is disposed in a location that contacts the first rotor core 3*a* in the axial direction. The second protrusion 6*b* is disposed between two of the second magnets 2*b* that are adjacent in the circumferential direction.

During manufacture the rotor 10, when attaching the first magnet 2*a* to the first rotor core 3*a*, by making a location of the first protrusion 6*a* be a reference point, aligning a location of the first magnet 2*a* in the axial direction to a predetermined location becomes easy. Similarly, when attaching the second magnet 2*b* to the second rotor core 3*b*, by making a location of the second protrusion 6*b* be a reference point, aligning a location of the second magnet 2*b* in the axial direction to a predetermined location becomes easy. What is referred to as a "predetermined location" above is a location of the first magnet 2*a* and the second magnet 2*b*, where the distance between magnets D is greater than or equal to 0.5 mm, and less than or equal to 3.0 mm.

As such, by using protrusions 6*a*, 6*b*, it becomes easy to adjust the distance between magnets D so as to be in the range of greater than or equal to 0.5 mm and less than or equal to 3.0 mm. Accordingly, it is possible to have the torque ripple percentage of both the normal usage output and the maximum output cases be within the range of the target value. Further, it is possible, in advance, to form parts that are to become first protrusions 6*a* and second protrusions 6*b* in parts that are to become first rotor cores 3*a* and second rotor cores 3*b*. Accordingly, adjusting the distance between magnets D without increasing a number of parts is possible.

In the present embodiment, locations in the axial direction of the protrusions 6*a*, 6*b* are used as reference points when attaching the magnets 2*a*, 2*b* to the rotor cores 3*a*, 3*b*. Along with fulfilling the function mentioned above, the protrusions 6*a*, 6*b* need not be disposed in a vicinity of a surface where the rotor cores 3*a*, 3*b* contact one another. For example, the first protrusion 6*a* may be disposed in a center portion of the first rotor core 3*a* in the axial direction. In such case, if a marking or the like is located in the center portion of the first magnet 2*a* in the axial direction, by adjusting the location of the marking or the like with the first protrusion 6*a* as the reference point, adjustment of the first magnet 2*a* in the axial direction is possible. Similarly, the second protrusion 6*b* may be disposed in a center portion of the second rotor core 3*b* in the axial direction.

Figure 6:
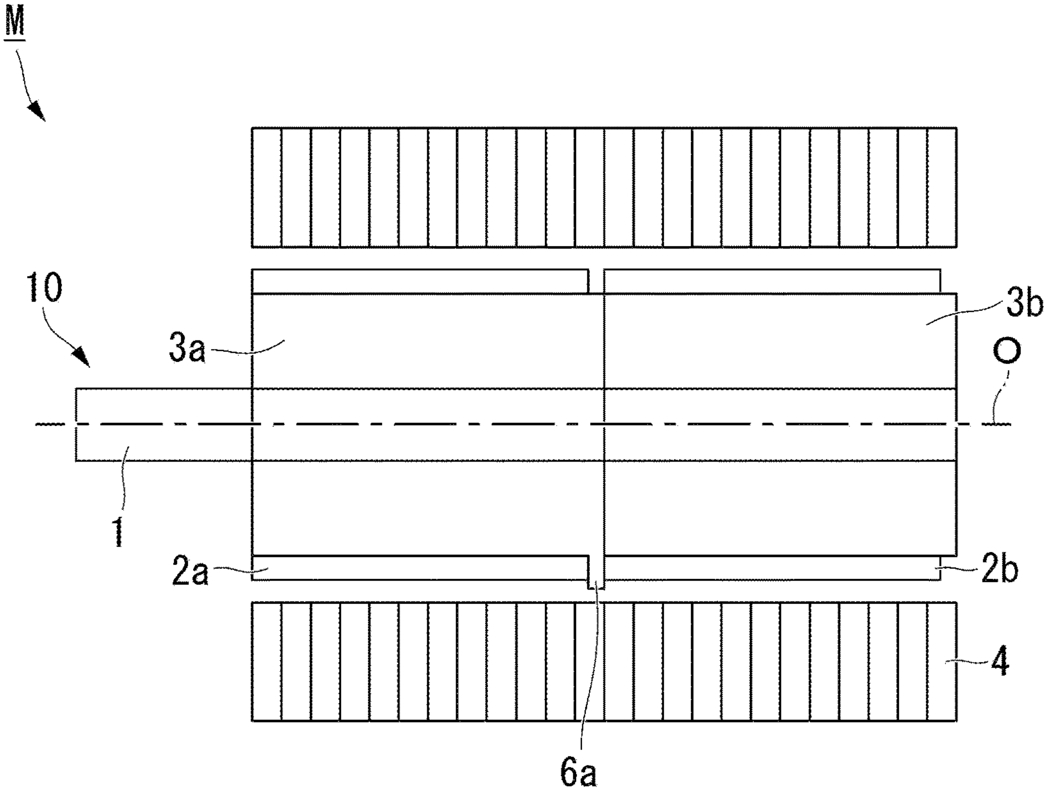
FIG. 6 A cross-sectional view of the rotating electric machine according to a modified example of the first embodiment.

As in shown in FIG. 6, the first protrusion 6*a* does not have to be formed in the first rotor core 3*a*, and the second protrusion 6*b* does not have to be formed in the second rotor core 3*b*. In such case, it is possible to at least use the first protrusion 6*a* as a location reference point in the axial direction when attaching the first magnet 2*a* to the first rotor core 3*a*, making it easy to have the distance between magnets D be within the predetermined range. Similarly, the second protrusion 6*b* may be formed in the second rotor core 3*b*, and the first protrusion 6*a* may be formed in the first rotor core 3*a*.

Second Embodiment

Next, a rotating electric machine according to a second embodiment is explained. Since the rotating electric machine according to the present embodiment is similar in construction to the rotating electric machine of the first embodiment, explanations that follow focus mainly on differences therebetween.

Figure 7:
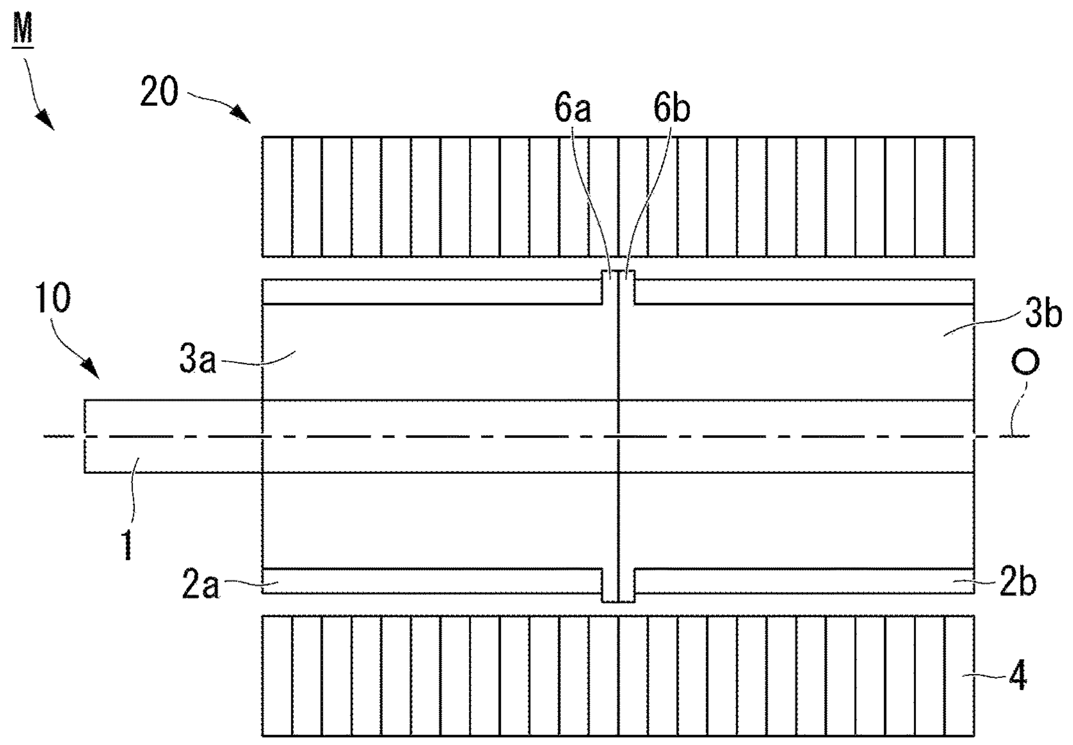
FIG. 7 A cross-sectional view of the rotating electric machine according to a second embodiment.

As shown in FIG. 7, in the present embodiment, the first protrusion 6*a* is formed over an entire circumference of the outer circumferential surface of the first rotor core 3*a*. Similarly, the second protrusion 6*b* is formed over an entire circumference of the outer circumferential surface of the second rotor core 3*b*. Although omitted from the drawings, the first protrusion 6*a* and the second protrusion 6*b* are annular, as seen from the axial direction. The first protrusion 6*a* and the second protrusion 6*b* are also in contact with one another.

According to the present embodiment, it is possible to avoid having the first magnet 2*a* and the second magnet 2*b* contact one another using the first protrusion 6*a* and the second protrusion 6*b*. In other words, it is possible to use the first protrusion 6*a* and the second protrusion 6*b* as a spacer. During manufacture of the rotor 10, it is possible to have the first magnet 2*a* abut against the first protrusion 6*a*, and the second magnet 2*b* abut against the first protrusion 6*a*. In such case, the sum of thicknesses of the first protrusion 6*a* and the second protrusion 6*b* in the axial direction become the distance between magnets D. Therefore, having the distance between magnets D be within a predetermined value range becomes easier. To be more specific, the sum of thicknesses of the first protrusion 6*a* and the second protrusion 6*b* in the axial direction may be within the range of 0.5 to 3.0 mm.

It is possible, in advance, to form locations that become the first protrusion 6*a* and the second protrusion 6*b* in core pieces that are to become the first rotor core 3*a* and the second rotor core 3*b*. Accordingly, controlling the distance between magnets D without increasing a number of parts is made easy. When stacking the core pieces in the axial direction, two types of core pieces, a first core piece where protrusions that become the protrusions 6*a*, 6*b* are formed, and a second core piece where the aforementioned protrusions are not formed, may be prepared. In this case, by changing the number of stacks of the first core piece, it possible to easily change the sum of thicknesses of the protrusions 6*a*, 6*b* (in other words, the distance between magnets D) in the axial direction.

Figure 8:
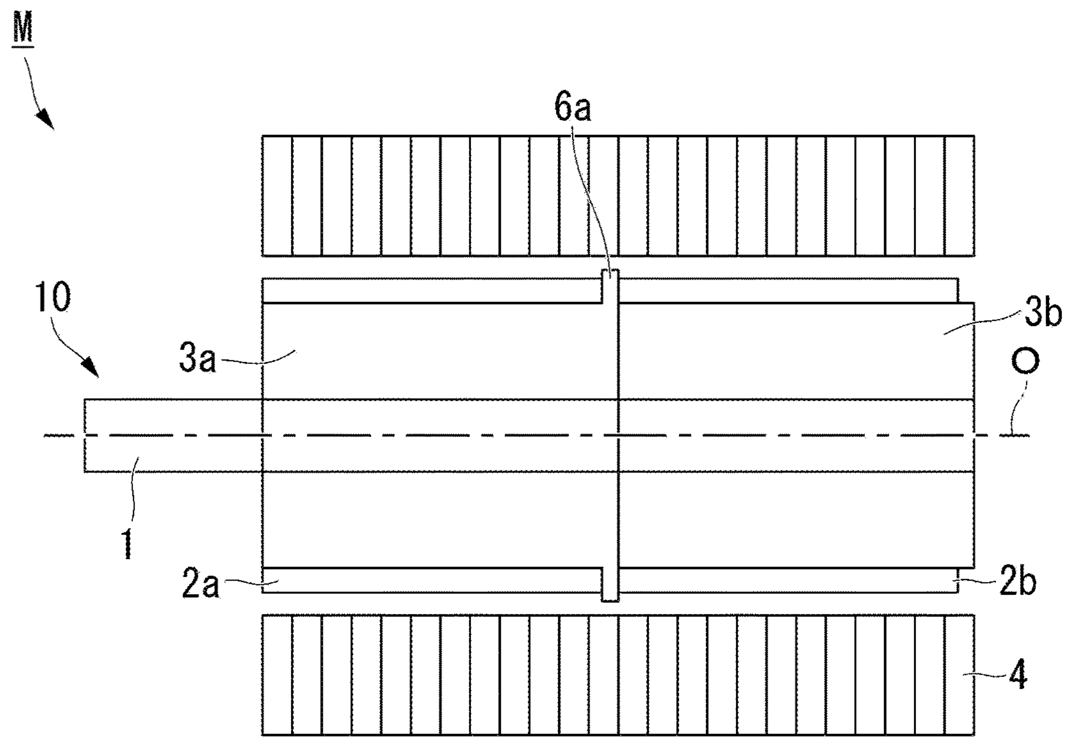
FIG. 8 A cross-sectional view of the rotating electric machine according to a modified example of the second embodiment.

An annular protrusion may be formed in only one rotor core out of the first rotor core 3*a* and the second rotor core 3*b*. In the example of FIG. 8, the annular first protrusion 6*a* is formed in the first rotor core 3*a*, and no annular protrusion is formed in the second rotor core 3*b*. Even in such case, it is possible to avoid having the first magnet 2*a* and the second magnet 2*b* contact one another by the existence of the first protrusion 6*a*. Both the first magnet 2*a* and the second magnet 2*b* may contact the first protrusion 6*a*. In such case, the thickness of the first protrusion 6*a* in the axial direction is the distance between magnets D. Therefore, the thickness of the first protrusion 6*a* may be within the range of 0.5 to 3.0 mm. Similarly, the annular protrusion second protrusion 6*b* may only be formed in the second rotor core 3*b*, and the thickness of the second protrusion 6*b* may be within the range of 0.5 to 3.0 mm.

The protrusions 6*a*, 6*b* need not be annular, as seen from the axial direction. For example, a plurality of first protrusions 6*a* may be disposed intermittently in the circumferential direction, and each of the first protrusions 6*a* may be located between the first magnet 2*a* and the second magnet 2*b* in the axial direction. Even in such case, each of the first protrusions 6*a* functions as a spacer to secure a gap between the first magnet 2*a* and the second magnet 2*b*. Similarly, a plurality of second protrusions 6*b* may be disposed intermittently in the circumferential direction, and each of the second protrusions 6*b* may be located between the first magnet 2*a* and the second magnet 2*b* in the axial direction.

Third Embodiment

Next, a rotating electric machine according to a third embodiment is explained. Since the rotating electric machine according to the present embodiment is similar in construction to the rotating electric machine of the first embodiment, explanations that follow focus mainly on differences therebetween.

Figure 9:
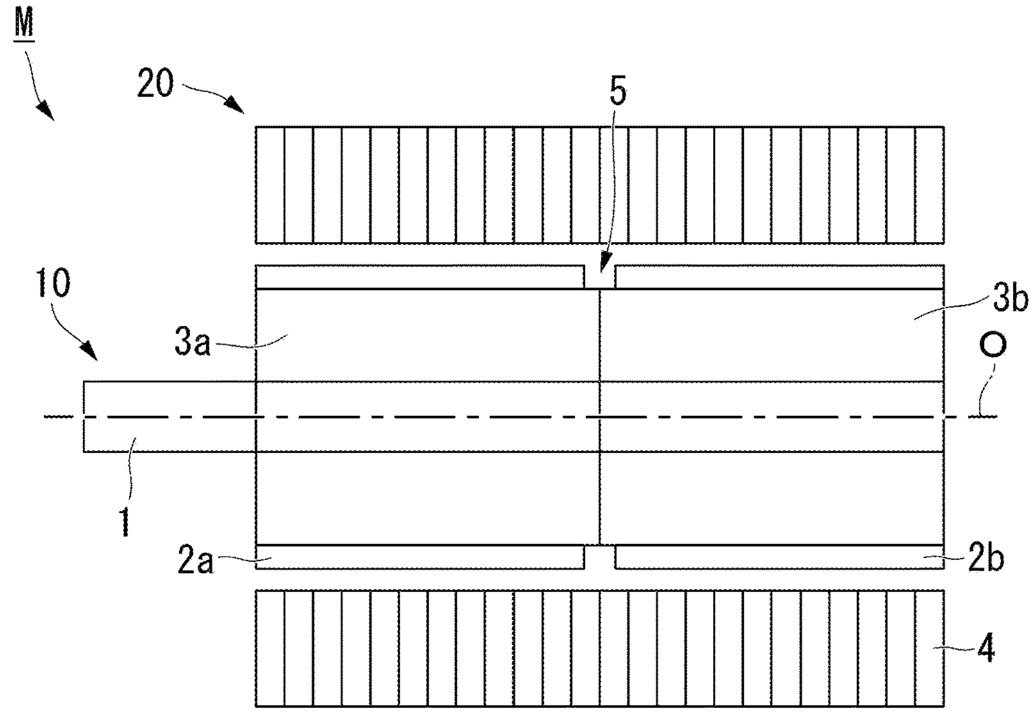
FIG. 9 A cross-sectional view of the rotating electric machine according to a third embodiment.

As shown in FIG. 9, in the present embodiment, the protrusions 6*a*, 6*b* are not formed in the rotor cores 3*a*, 3*b*, and a gap 5 between the first magnet 2*a* and the second magnet 2*b* is formed. In such case, a dimension of the gap 5 in the axial direction becomes the distance between magnets D. Therefore, by setting the dimension of the gap 5 in the axial direction to the range of 0.5 to 3.0 mm, the same effects as those mentioned in the first embodiment are obtainable.

Figure 10:
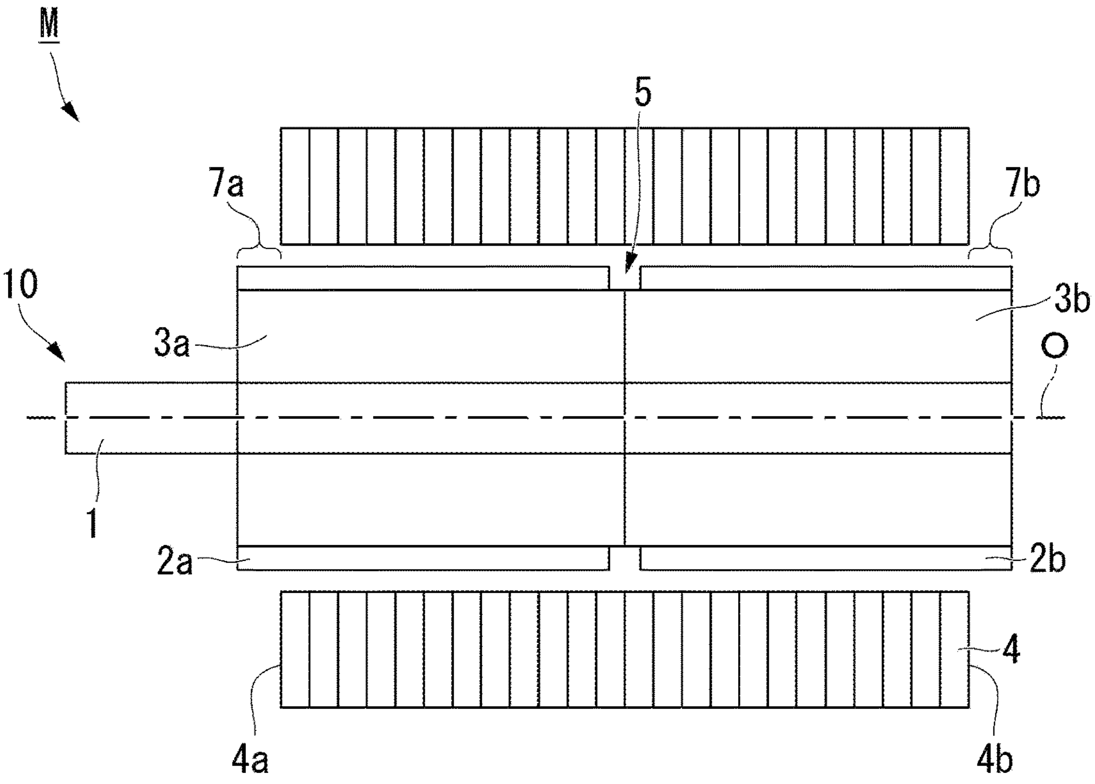
FIG. 10 A cross-sectional view of the rotating electric machine according to a modified example of the third embodiment.

As shown in the example of FIG. 9, lengths of the magnets 2*a*, 2*b* in the axial direction become shorter by the amount the gap 5 is provided. As such, the magnetic flux becomes smaller, and the torque that the rotating electric machine M outputs becomes smaller. Here, as shown in FIG. 10, it is possible to provide a first extension 7*a* in the first magnet 2*a*. The first extension 7*a* is a portion that extends outwards in the axial direction from a first end surface 4*a* of the stator 4, out of the first magnet 2*a*. Similarly, it is possible to provide a second extension 7*b* on the second magnet 2*b*. The second extension 7*b* is a portion that extends outwards in the axial direction from a second end surface 4*b* of the stator 4, out of the second magnet 2*b*. To support the first extension 7*a*, the first rotor core 3*a* extends outwards in the axial direction from the first end surface 4*a* of the stator 4. To support the second extension 7*b*, the second rotor core 3*b* extends outwards in the axial direction from the second end surface 4*b* of the stator 4.

According to the present embodiment, by having the magnetic flux of the magnets 2*a*, 2*b* which decreased due to the provision of the gap 5 be compensated by the first extension 7*a* and the second extension 7*b*, it is possible to suppress a decrease in the output torque of the rotating electric machine M.

If lengths of extensions 7*a*, 7*b* are excessively long, a percentage of magnetic flux entering the stator 4 from the extensions 7*a*, 7*b* decreases, and utilization efficiency of the magnetic flux of the magnets 2*a*, 2*b* decreases. Hence, it is preferable to have a length of protrusion of the first extension 7*a* in the axial direction with respect to the first end surface 4*a* be within the range of 0.5 to 3.0 mm. Similarly, it is preferable to have a length of protrusion of the second extension 7*b* in the axial direction with respect to the second end surface 4*b* be within the range of 0.5 to 3.0 mm.

An extension may be provided in only one out of the first magnet 2*a* and the second magnet 2*b*. For example, the first extension 7*a* may be provided in the first magnet 2*a*, and the second extension 7*b* need not be provided in the second magnet 2*b*. Even in such case, since at least the magnetic flux of the first magnet 2*a* is compensated for, it is possible to suppress the decrease in the output torque of the rotating electric machine M. Similarly, the second extension 7*b* may be provided in the second magnet 2*b*, and the extension may not be provided in the first magnet 2*a*.

Both or one of the first extension 7*a* and the second extension 7*b* shown in FIG. 10 may be provided in the rotor 10 shown in FIG. 3, FIG. 6, FIG. 7, and FIG. 8.

As explained above, a rotor 10 according to the present embodiment includes the shaft 1, the first rotor core 3*a* and the second rotor core 3*b* that are fixed to the shaft 1, and that are disposed so as to align in the axial direction along the center axis O of the shaft 1, the plurality of first magnets 2*a* that are disposed so as to align in the circumferential direction which revolves around the center axis O on the outer circumferential surface of the first rotor core 3*a*, and the plurality of second magnets 2*b* that are disposed so as to align in the circumferential direction on the outer circumferential surface of the second rotor core 3*b*, wherein the locations of the plurality of first magnets 2*a* and the plurality of second magnets 2*b* are offset in the circumferential direction, and an interval between the plurality of first magnets 2*a* and the plurality of second magnets 2*b* in the axial direction is within the range of 0.5 to 3.0 mm.

According to the above configuration of the rotor 10, by having the distance between magnets D be greater than or equal to 0.5 mm, it is possible to suppress the torque ripple in the case of normal usage output. By having the distance between magnets D be less than or equal to 3.0 mm, it is possible to suppress the torque ripple in the case of maximum output. Accordingly, it is possible to provide a rotor 10 that is capable of decreasing the torque ripple in in both cases of normal usage output and of maximum output.

The protrusion (the first protrusion 6*a* or the second protrusion 6*b*) may be formed on at least one of the first rotor core 3*a* and the second rotor core 3*b*, and the protrusion may be located between two of the first magnets 2*a* adjacent to one another in the circumferential direction, or between two of the second magnets 2*b* adjacent to one another in the circumferential direction. In such case, it is possible to use the protrusion as the reference point when attaching the first magnet 2*a* to the first rotor core 3*a*, or when attaching the second magnet 2*b* to the second rotor core 3*b*.

The protrusion (the first protrusion 6*a* or the second protrusion 6*b*) may be formed on at least one of the first rotor core 3*a* and the second rotor core 3*b*, and the protrusion may be located between the first magnet 2*a* and the second magnet 2*b* that are adjacent to one another in the axial direction. In such case, the protrusion functions as a spacer, and it is possible to avoid having the first magnet 2*a* come into contact with the second magnet 2*b*.

The protrusion may be annular, as seen from the axial direction. In such case, it is possible to easily dispose the protrusion between all of the first magnets 2*a* and all of the second magnets 2*b*.

The protrusions may come into contact with both the first magnet 2*a* and the second magnet 2*b* that are adjacent in the axial direction. In such case, a dimension of the protrusion in the axial direction is the distance between magnets D. Therefore, it is possible to more easily adjust the distance between magnets D within the range of 0.5 to 3.0 mm.

The gap 5 may be provided between the plurality of first magnets 2*a* and the plurality of second magnets 2*b*.

The rotating electric machine M according to the present disclosure includes the rotor 10, and the stator 4 that surrounds the rotor 10.

The extension (the first extension 7*a* or the second extension 7*b*) that extends from end surfaces of the stator 4 in the axial direction may be formed in at least one of the plurality of first magnets 2a and the plurality of second magnets 2b. In such case, it is possible to compensate the decrease in magnetic flux of the first magnet 2a or the second magnet 2b due to the provision of the distance between magnets D. Therefore, it is possible to suppress the decrease in the output torque of the rotating electric machine M.

The dimension of the extension in the axial direction may be within the range of 0.5 to 3.0 mm. In such case, it is possible to suppress a decrease in effective utilization rate of the magnetic flux of the magnet due to the extension being excessively large.

An electric power steering device according to the present disclosure includes the rotating electric machine M mentioned above. According to such electric power steering device, it is possible to achieve comfortable operation during both cases of normal usage output or maximum output.

The technical scope of the present disclosure is not limited to the embodiments mentioned above, and It is possible to add various changes, so long as the changes thereof do not depart from the technical scope of the present disclosure.

For example, the rotating electrical machine M according to the present disclosure may be utilized in a device other than an electric power steering device.

It is possible to combine each of the previously mentioned embodiments or modification examples, as well as change any of the embodiments appropriately.

REFERENCE SIGN LIST

1 Shaft, 2a First Magnet, 2b Second Magnet, 3a First Rotor Core, 3b Second Rotor Core, 4 Stator, 5 Gap, 6a, 6b Protrusion, 7a, 7b Extension, 10 Rotor, M Rotating Electric Machine, O Center Axis

The invention claimed is:

1. A rotor, comprising:

a shaft;

a first rotor core and a second rotor core that are fixed to the shaft, and that are disposed so as to align in an axial direction along a center axis of the shaft;

a plurality of first magnets that are disposed so as to align in a circumferential direction which revolves around the center axis on an outer circumferential surface of the first rotor core, and a plurality of second magnets that are disposed so as to align in the circumferential direction on the outer circumferential surface of the second rotor core, wherein locations of the plurality of first magnets and the plurality of second magnets are offset in the circumferential direction, a first protrusion is formed on the first rotor core, a second protrusion is formed on the second rotor core, the first protrusion is located between two of the first magnets adjacent to one another in the circumferential direction, the second protrusion is located between two of the second magnets adjacent to one another in the circumferential direction, locations of the first protrusion and the second protrusion are offset from one another in the circumferential direction, an interval between the plurality of first magnets and the plurality of second magnets in the axial direction is within a range of 0.5 to 3.0 mm, wherein the first protrusion and second protrusion extend beyond the first magnets and second magnets in the axial direction, respectively, and a length of the extension beyond the first magnets and the second magnets defines the interval, and wherein the first protrusion contacts one of the first magnets and the second protrusion contacts one of the second magnets in the axial direction, an axial most extension of the first protrusion is flush with the axial most surface of the first rotor core and an axial most extension of the second protrusion is flush with the axial most surface of the second rotor core.

2. The rotor according to claim 1, wherein:

the interval includes an air gap provided between the plurality of first magnets and the plurality of second magnets.

3. A rotating electric machine comprising:

the rotor according to claim 2, and a stator that surrounds the rotor.

4. An electric power steering device comprising:

the rotating electric machine according to claim 3.

5. The rotating electric machine according to claim 3, wherein:

an extension that extends from an end surface of the stator in the axial direction is formed in at least one of the plurality of first magnets and the plurality of second magnets.

6. An electric power steering device comprising:

the rotating electric machine according to claim 5.

7. The rotating electric machine according to claim 5, wherein:

a dimension of the extension in the axial direction is within the range of 0.5 to 3.0 mm.

8. An electric power steering device comprising:

the rotating electric machine according to claim 7.

9. A rotating electric machine comprising:

the rotor according to claim 1, and a stator that surrounds the rotor.

10. The rotating electric machine according to claim 9, wherein:

an extension that extends from an end surface of the stator in the axial direction is formed in at least one of the plurality of first magnets and the plurality of second magnets.

11. An electric power steering device comprising:

the rotating electric machine according to claim 7.

12. The rotating electric machine according to claim 10, wherein:

a dimension of the extension in the axial direction is within the range of 0.5 to 3.0 mm.

13. An electric power steering device comprising:

the rotating electric machine according to claim 10.

14. An electric power steering device comprising:

the rotating electric machine according to claim 12.

* * * * *